(12) United States Patent
Demuth et al.

(10) Patent No.: US 7,146,819 B2
(45) Date of Patent: Dec. 12, 2006

(54) METHOD OF MONITORING REFRIGERANT LEVEL

(75) Inventors: Walter Demuth, Gerlingen (DE); Rainer Heilig, Waghaeusel (DE); Volker Kirschner, Muehlacker (DE); Martin Kotsch, Ludwigsburg (DE); Hans-Joachim Krauss, Stuttgart (DE); Hagen Mittelstrass, Bondorf (DE); Harald Raiser, Balingen (DE); Michael Sickelmann, Stuttgart (DE); Karl-Heinz Staffa, Stuttgart (DE); Christoph Walter, Stuttgart (DE)

(73) Assignee: BEHR GmbH & Co., Stuttgart (DE)

( * ) Notice: Subject to any disclaimer, the term of this patent is extended or adjusted under 35 U.S.C. 154(b) by 74 days.

(21) Appl. No.: 10/774,509

(22) Filed: Feb. 10, 2004

(65) Prior Publication Data

US 2004/0159114 A1 Aug. 19, 2004

Related U.S. Application Data

(62) Division of application No. 10/012,027, filed on Dec. 11, 2001, now Pat. No. 6,708,508.

(30) Foreign Application Priority Data

Dec. 11, 2000 (DE) ................ 100 61 545

(51) Int. Cl.
*G01K 13/00* (2006.01)
*F25B 45/00* (2006.01)
*F25B 41/00* (2006.01)

(52) U.S. Cl. .................. 62/129; 62/208; 62/130; 62/149

(58) Field of Classification Search .......... 62/125, 62/126, 127, 129, 208, 209, 130, 149
See application file for complete search history.

(56) References Cited

U.S. PATENT DOCUMENTS

| 4,563,878 A | 1/1986 | Baglione |
| 4,745,765 A | 5/1988 | Pettitt |

(Continued)

FOREIGN PATENT DOCUMENTS

DE 198 03 196 A1 8/1998

(Continued)

*Primary Examiner*—Marc Norman
(74) *Attorney, Agent, or Firm*—Foley & Lardner LLP

(57) ABSTRACT

The invention relates to a method of refrigerant level monitoring in a refrigerant circuit of an air-conditioning or heat-pump system having a compressor and a refrigerant which may, depending on the operating point, be operated in the supercritical range. The method includes standstill level monitoring with the compressor switched off and/or in-operation level monitoring with the compressor switched on. In the case of in-operation level monitoring, the refrigerant overheat (dTü) at the evaporator is registered and, in the event of excessive overheat, it is concluded that there is underfilling. At a standstill, the pressure and temperature of the refrigerant are registered, and it is concluded that there is an improper refrigerant filling level if the pressure ($p_{KM}$) lies below a minimum pressure value ($p_{min}$) or the temperature ($T_{KM}$) lies above a maximum saturation temperature value ($T_S$) with the pressure being outside a predefinable intended pressure range ($[p_u, p_o]$).

5 Claims, 3 Drawing Sheets

U.S. PATENT DOCUMENTS

| | | |
|---|---|---|
| 5,009,076 A | 4/1991 | Winslow |
| 5,044,168 A | 9/1991 | Wycoff |
| 5,239,865 A | 8/1993 | Salzer et al. |
| 5,457,965 A | 10/1995 | Blair et al. |
| 5,481,884 A * | 1/1996 | Scoccia ................ 62/129 |
| 5,586,445 A | 12/1996 | Bessler |
| 5,647,222 A | 7/1997 | Sarakinis |
| 5,983,657 A | 11/1999 | Murata et al. |
| 5,987,903 A | 11/1999 | Bathla |
| 6,058,719 A * | 5/2000 | Cochran ................ 62/129 |
| 6,112,532 A | 9/2000 | Bakken |
| 6,134,805 A | 10/2000 | Chowdhury et al. |
| 6,216,477 B1 | 4/2001 | Dienhart et al. |
| 6,330,802 B1 | 12/2001 | Cummings et al. |
| 2006/0059925 A1 * | 3/2006 | Horan et al. ............ 62/129 |

FOREIGN PATENT DOCUMENTS

| | | |
|---|---|---|
| DE | 198 46 026 A1 | 4/2000 |
| EP | 0 254 253 A2 | 1/1988 |

* cited by examiner

METHOD OF MONITORING REFRIGERANT LEVEL

CROSS-REFERENCE TO RELATED PATENT APPLICATIONS

The present application is a divisional of U.S. application Ser. No. 10/012,027, filed Dec. 11, 2001 now U.S. Pat. No. 6,708,508, the entire contents of which are incorporated herein by reference.

The present application claims the right of priority under 35 U.S.C. § 119(a) based on German Patent Application No. 100 61 545.7, filed Dec. 11, 2000, the entire content of which is hereby incorporated by reference.

BACKGROUND OF THE INVENTION

The present invention relates to a method of monitoring refrigerant level (filling amount of refrigerant) in a refrigerant circuit of an air-conditioning or heat-pump system with a compressor and a refrigerant operated in the supercritical range as a function of the operating point.

In this case, a "refrigerant which may, depending on the operating point, be operated in the supercritical range" is to be understood as one which, at least for some of the possible system operating states, is in the supercritical range and is therefore present in vapor form even in the section of the refrigerant circuit from the "condenser", (functioning at such time as a gas cooler) to the evaporator. In particular, the method is suitable for monitoring the $CO_2$ level in $CO_2$ air-conditioning systems, which are increasingly being used in motor vehicles. The method includes standstill level monitoring, that is to say level monitoring with the compressor switched off, and/or in-operation level monitoring, that is to say level monitoring with the compressor switched on.

U.S. Pat. No. 4,745,765 includes in-operation level monitoring in which conclusions are drawn about possible underfilling, by using the measured temperature of superheated refrigerant at the evaporator output and the ambient temperature.

U.S. Pat. No. 5,481,884 describes a method which includes both standstill and in-operation level monitoring. To this end, when the air-conditioning or heat-pump system considered there is at a standstill, the refrigerant pressure on the suction side of the compressor and the ambient temperature are measured. The saturation pressure associated with the measured ambient temperature is determined and used as a reference pressure, with which the measured refrigerant pressure is compared. If the measured pressure compared with the reference pressure is too low, it is concluded that there is underfilling. During operation of the system, temperature and pressure of the refrigerant are measured on the suction side of the compressor. The saturation temperature associated with the measured pressure is determined and used as a reference temperature, with which the measured refrigerant temperature is compared. If the measured temperature lies too far above the reference temperature, it is concluded that there is underfilling.

SUMMARY OF THE INVENTION

The present invention has as its principal object to provide a novel method of refrigerant level monitoring of the general type mentioned above. With relatively little effort, the method permits reliable detection of erroneous filling, i.e., both underfilling and/or overfilling, on a refrigerant which may, depending on the operating point, be operated in the supercritical range in a refrigerant circuit of an air-conditioning or heat-pump system.

In accomplishing the objects of the invention, there has been provided according to one aspect a method of refrigerant level monitoring in a refrigerant circuit of an air-conditioning or heat-pump system having a compressor and a refrigerant which may, depending on of the operating point, be operated in the supercritical range, the method comprising: at least standstill level monitoring with the compressor switched off, comprising measuring both the pressure ($p_{KM}$) and the temperature ($T_{KM}$) of the refrigerant, and determining whether the measured refrigerant pressure lies below a temperature-independent predetermined minimum pressure value ($p_{min}$) or whether the measured refrigerant temperature lies above a predetermined maximum saturation temperature value ($T_S$) and the measured refrigerant pressure lies outside a predetermined target pressure range ($p_u$, $p_o$).

In a preferred embodiment, the method further comprises in-operation level monitoring with the compressor switched on, which is carried out by measuring the refrigerant superheat (dTü) at the evaporator of the system, and determining whether the measured superheat (dTü) lies above a predetermined limiting value ($dTü_G$).

According to another preferred embodiment of the invention, there has been provided a method of refrigerant level monitoring in a refrigerant circuit of an air-conditioning or heat-pump system having a compressor and a refrigerant which may, depending on the operating point, be operated in the supercritical range, the method comprising: at least in-operation level monitoring with the compressor switched on, comprising measuring the refrigerant superheat (dTü) at the evaporator of the system, and determining whether the measured superheat (dTü) lies above a predetermined limiting value ($dTü_G$).

According to another aspect of the invention, there has been provided an apparatus for refrigerant level monitoring in a refrigerant circuit of an air-conditioning or heat-pump system having a compressor and a refrigerant which may, depending on the operating point, be operated in the supercritical range, the apparatus comprising: at least a system for standstill level monitoring with the compressor switched off, comprising detectors for measuring both the pressure ($p_{KM}$) and the temperature ($T_{KM}$) of the refrigerant, and a calculation circuit for determining whether the measured refrigerant pressure lies below a temperature-independent predetermined minimum pressure value ($p_{min}$) or whether the measured refrigerant temperature lies above a predetermined maximum saturation temperature value ($T_S$) and the measured refrigerant pressure lies outside a predetermined target pressure range ($p_u$, $p_o$).

According to another preferred embodiment, the apparatus comprises, either as an alternative or in addition to the system for standstill level monitoring, a system for in-operation level monitoring with the compressor switched on, comprising detectors for measuring the refrigerant superheat (dTü) at the evaporator of the system, and a calculation circuit for determining whether the measured superheat (dTü) lies above a predetermined limiting value ($dTü_G$).

According to yet another aspect of the invention, there has been provided a motor vehicle embodying the apparatus described above in an air-conditioning system that employs $CO_2$ as refrigerant.

Further objects, features and advantages of the present invention will become apparent from the detailed description of preferred embodiments that follows, when considered together with the accompanying figures of drawing.

BRIEF DESCRIPTION OF THE DRAWINGS

One advantageous embodiment of the invention is illustrated in the drawings and will be described below. In the drawings.

DETAILED DESCRIPTION OF THE PREFERRED EMBODIMENTS

The method of the invention specifically includes level monitoring when the system is at a standstill, with the pressure and temperature of the refrigerant being registered. It can be concluded that there is erroneous filling, firstly, if the registered refrigerant pressure lies below a minimum pressure value, which can be predefined suitably. In this case, there is underfilling, that is to say too low a level. It can also be concluded that there is erroneous filling if the measured refrigerant temperature lies above a predefinable maximum saturation temperature value and the measured refrigerant pressure lies outside a predefinable intended pressure range. Depending on whether the detected pressure falls below or exceeds the intended pressure range, it is concluded that there is underfilling or overfilling, i.e., too low or too high a level. In this case, use is made of the fact that, in the case of a refrigerant temperature lying above the maximum saturation temperature, at constant temperature the pressure decreases as the level falls and increases as the level rises.

In a further preferred embodiment of this standstill level monitoring, the intended pressure range is defined by using a temperature-dependent predefinable upper and/or a temperature-dependent predefinable lower pressure limiting value, which takes account of the fact that the pressure rises as the temperature rises, given a constant level.

The method according to another preferred embodiment specifically includes level monitoring during operation of the system, specifically in such a way that the refrigerant superheat at the evaporator is determined, i.e., the temperature rise of the refrigerant across the evaporator. It can be concluded that there is underfilling if the superheat exceeds a predefinable maximum value.

In a further preferred embodiment of this in-operation level monitoring, the refrigerant superheat is determined directly by measuring and forming the difference between the refrigerant temperature at the evaporator inlet and at the evaporator outlet, or indirectly with the aid of the refrigerant temperature on the evaporator inlet side and the temperature on the evaporator outlet side of a medium that is cooled by the evaporator, such as an air stream. Use of the latter can provide simplification in measurement terms as compared with a direct measurement of the refrigerant temperature on the evaporator outlet side.

Figure 1:
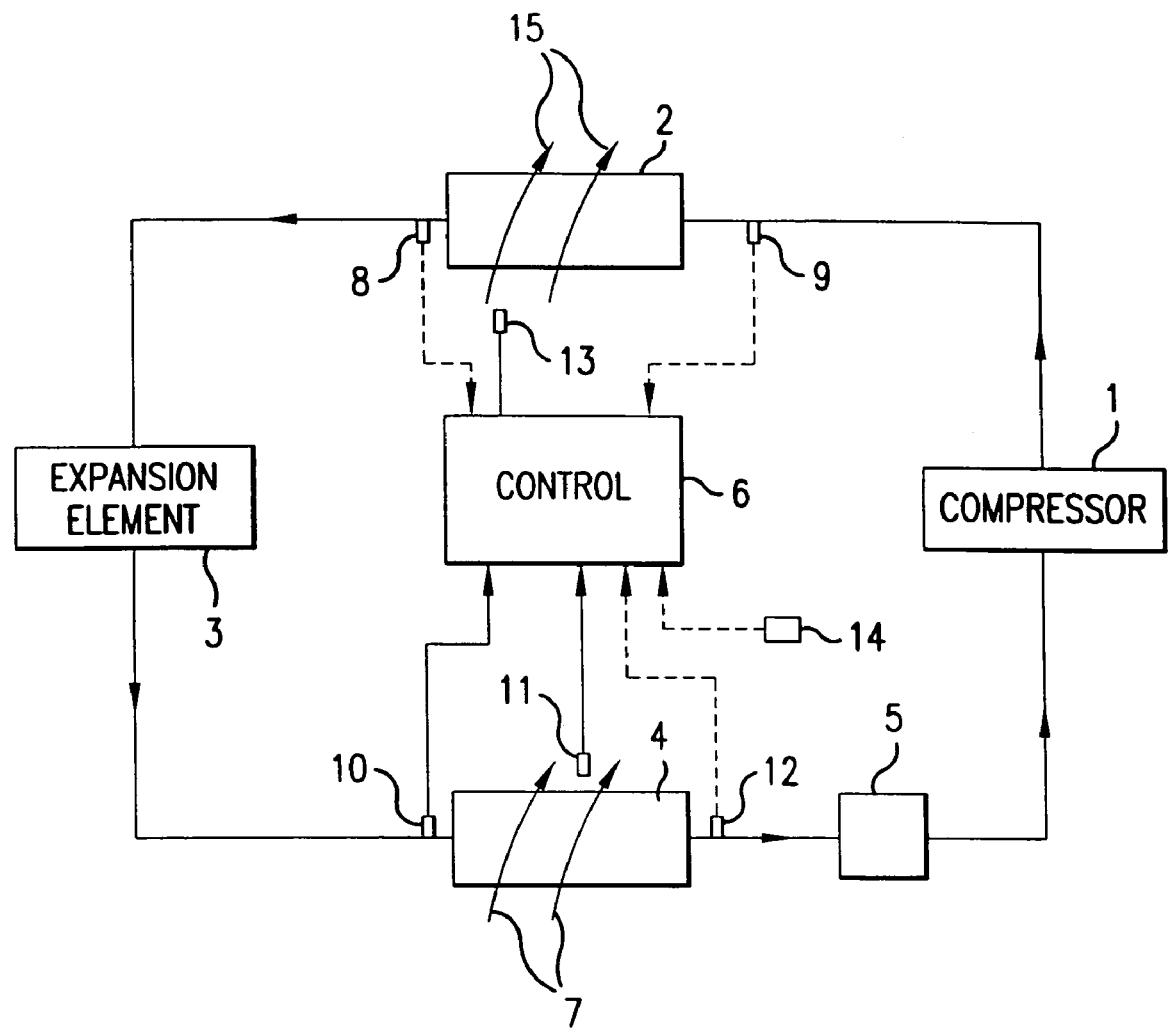
FIG. 1 is a schematic block diagram showing a $CO_2$ air-conditioning system with means for $CO_2$ level monitoring.

Turning now to the drawings, FIG. 1 shows in schematic form the components of interest here in an air-conditioning system, which operates with $CO_2$ as the refrigerant and, for example, can be used in a motor vehicle. The system comprises a refrigerant circuit having a compressor 1, downstream of which a gas cooler 2 is connected on the high-pressure side. Connected downstream of the gas cooler is an expansion element 3, which is followed by an evaporator 4. Via a collector 5, the refrigerant, e.g., the $CO_2$, passes to the compressor 1 again. An air stream 7 to be cooled is led over the evaporator 4 and, for example, is blown into the interior of a motor vehicle. The gas cooler 2 is cooled by an air stream 15 led over it.

An air-conditioning system control unit 6 controls the operation of the air-conditioning system in a manner which is conventional and therefore not specifically discussed. Together with associated sensor means, the control unit also provides $CO_2$ level monitoring, which will be discussed in more detail below.

The sensor means provided for this purpose comprise a first refrigerant temperature sensor 10 on the inlet side of the evaporator 4 and an air temperature sensor 11 on the air outlet side of the evaporator 4. Optionally, a second refrigerant temperature sensor 8 arranged on the outlet side of the gas cooler 2 and/or a refrigerant pressure sensor 9, arranged between the compressor 1 and the gas cooler 2, for example, can be provided, as indicated with dashed lines in FIG. 1.

As an alternative to the air temperature sensor 11, a third refrigerant temperature sensor 12 can be provided on the outlet side of the evaporator 4, as indicated with dashed lines in FIG. 1. Furthermore, as an alternative to the second refrigerant temperature sensor 8, an air temperature sensor 13 can be provided on the air inlet side of the gas cooler 2, or an ambient air temperature sensor 14, as indicated with dashed lines in each case in FIG. 1. Since such air temperature sensors 13, 14 are frequently present in any case for other purposes, this may make the refrigerant temperature sensor 8 on the gas cooler outlet side unnecessary, if the accuracy of the refrigerant temperature estimate which can be achieved therewith is adequate.

Figure 2:
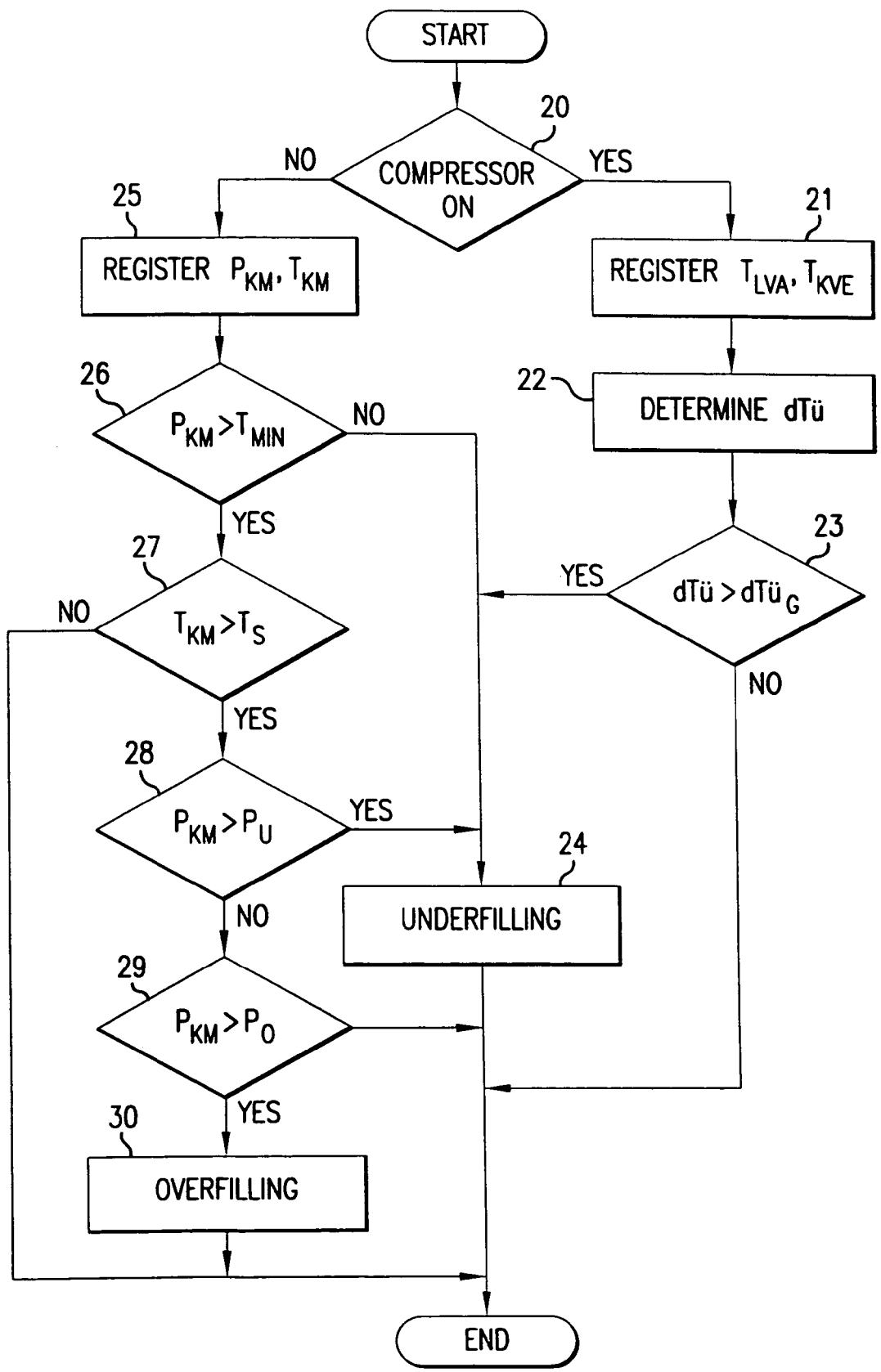
FIG. 2 is a flow diagram relating to monitoring the $CO_2$ level for the air-conditioning system of FIG. 1, at a standstill and in operation.

The air-conditioning system control unit 6 receives the associated measured signals from the aforementioned sensors and evaluates these signals suitably for the purpose of $CO_2$ level monitoring at a standstill and in system operation. FIG. 2 illustrates the associated level monitoring method schematically as a flow diagram.

As can be seen from FIG. 2, the control unit 6 initially determines, in accordance with the method, whether the system is operating or at a standstill, i.e., whether the compressor 1 is switched on or off (step 20). If the system is operating, the control unit 6 registers the refrigerant temperature $T_{KVE}$ on the evaporator inlet side via the associated temperature sensors 10, 11, and the temperature $T_{LVA}$ of the air stream 7 led over the evaporator 4 on the air outlet side of the evaporator 4 (step 21). From this, the control unit 6 determines the superheat dTü at the evaporator 4 by using the relationship $$dT\ddot{u}=T_{KVA}-T_{KVE}=F\cdot(T_{LVA}-T_{KVE}),$$

where $T_{KVA}$ designates the refrigerant temperature on the evaporator outlet side and F a proportionality factor (step 22). If the optional refrigerant temperature sensor 12 is present there, then the latter can be used to measure the refrigerant temperature $T_{KVA}$ on the evaporator outlet side directly, and in order to determine the superheat dTü at the evaporator 4 its definition equation $dT\ddot{u}=T_{KVA}-T_{KVE}$ can then be used directly. Alternatively, use can be made of the fact that the superheat dTü at the evaporator 4 is proportional to the difference between the air outlet temperature $T_{LVA}$ and the refrigerant inlet temperature $T_{KVE}$ at the evaporator 4, the proportionality factor F depending on the quantity of air led over the evaporator 4 and therefore on the set output of an associated air blower (not shown), since the quantity of air influences the air-side transfer of heat at the evaporator 4.

After the superheat dTü at the evaporator 4 has been determined in one or the other way, the control unit 6 determines whether the instantaneous superheat dTü determined lies above a predefined limiting value $dTü_G$ of, for example, 5 K (step 23). If this is the case, it is concluded that there is underfilling, i.e., too low a refrigerant level in the refrigerant circuit, and the control unit 8 outputs appropriate underfilling information (step 24).

If the system is at a standstill, the control unit 6 registers the refrigerant temperature $T_{KM}$, for example, via the refrigerant temperature sensor 10 or 12 on the evaporator, and the refrigerant pressure $p_{KM}$ in the refrigerant circuit, directly via the pressure sensor 9 or indirectly, for example by registering a temperature (step 25). Alternatively, in order to register the coolant temperature directly, depending on the sensor equipment of the system, an indirect determination of the same can be provided by using the temperature of the ambient air, measured via the ambient air temperature sensor 14, and/or the temperature of the air stream 15 led over the gas cooler 2, measured by the associated air temperature sensor 13, at the air inlet side of the gas cooler 2. The air temperature measured by the sensor 14 or by the sensor 15 may permit an adequately accurate estimate of the refrigerant temperature when the system is at a standstill, in particular following a relatively long system standstill or taking into account the time period which has elapsed since the system was switched off.

The control unit 6 then determines whether the registered refrigerant pressure $p_{KM}$ is greater than a predefinable minimum pressure $p_{min}$ of, for example, 15 bar (step 26). If this is not the case, this result is again judged to mean underfilling of the refrigerant circuit, and the control unit 6 outputs the underfilling information (step 24).

If, on the other hand, the measured refrigerant pressure $p_{KM}$ lies above the minimum pressure $p_{min}$, the control unit 6 next determines whether the registered refrigerant temperature $T_{KM}$ lies above a predefined maximum saturation temperature $T_S$ (step 27). The latter is determined by a predefined intended density or optimum density of the refrigerant in the refrigerant circuit, which is around 250 kg/m³, for example, and results from the internal volume of the refrigerant circuit, for example, about 2 dm³, and the desired intended quantity of $CO_2$ of about 500 g, for example. At the same time, therefore, the maximum saturation pressure $p_S$ associated with the predefinable intended density is therefore defined.

Figure 3:
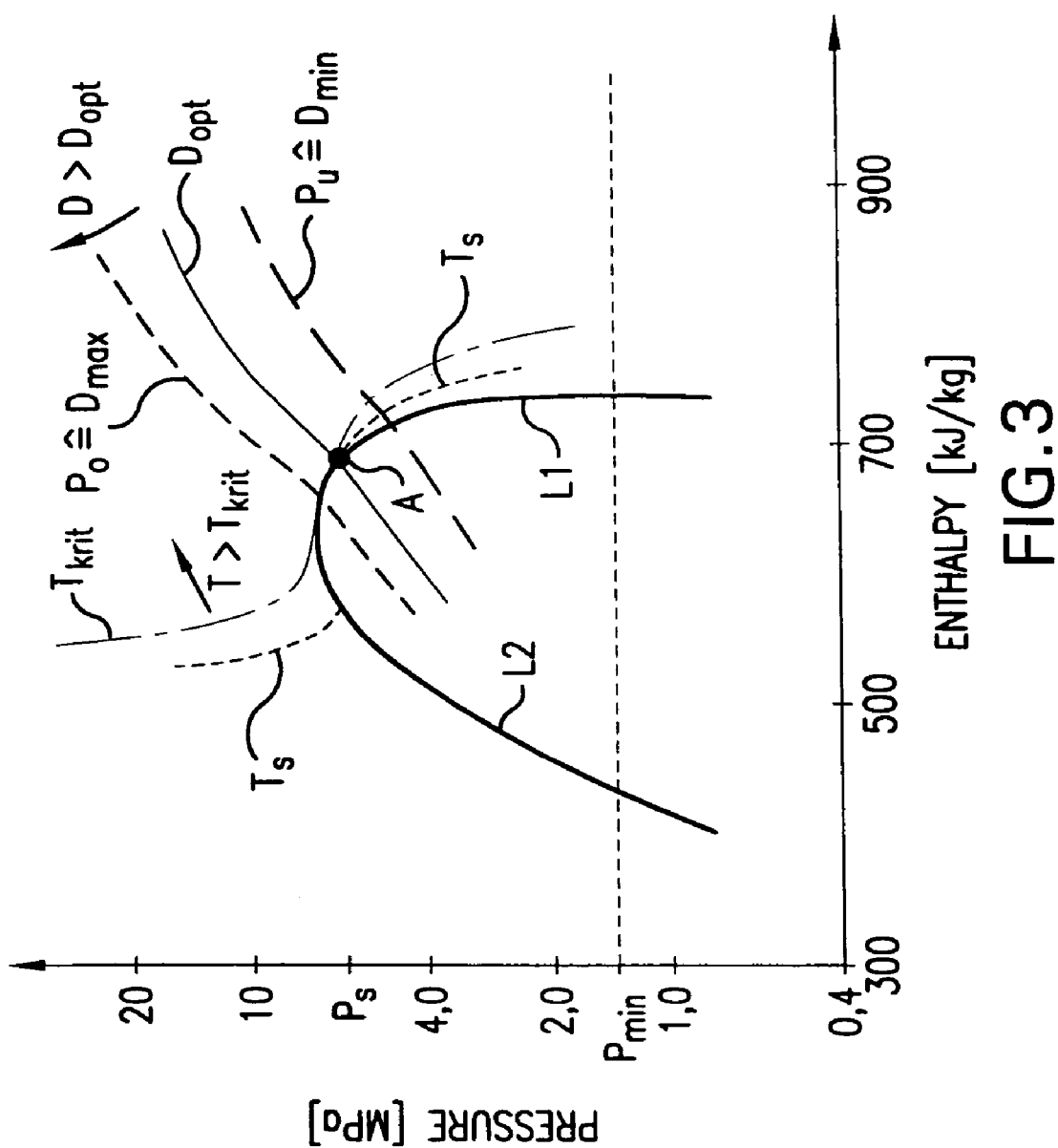
FIG. 3 is a pressure-enthalpy characteristic map for $CO_2$ to illustrate the refrigerant level monitoring method according to FIG. 2.

FIG. 3 illustrates these conditions by using the pressure-enthalpy characteristic map for $CO_2$. For the purpose of orientation, the limit lines for saturated vapor L1 and saturated liquid L2 and the characteristic curve of the critical temperature $T_{krit}$ are reproduced. The latter represents the limiting temperature above which the $CO_2$ can be present only in gaseous form. Also shown is the density characteristic curve for an assumed optimum density $D_{opt}$ of 250 kg/m³, whose point of intersection A with the limit line L1 for saturated vapor represents the maximum saturation pressure $p_S$ belonging to this intended density $D_{opt}$ and the associated maximum saturation temperature $T_S$.

If the registered refrigerant temperature $T_{KM}$ is not higher than the maximum saturation temperature $T_S$ belonging to the predefined intended density $D_{opt}$, the $CO_2$ is within the two-phase coexistence region. Since, in this region, as the level rises and falls, the vapor content increases and decreases and, in the process, the pressure and temperature of the refrigerant remain constant, it is not possible to draw any conclusions about the level from the measured pressure and temperature data obtained, and thus there will be no statement in this regard. If, on the other hand, the registered refrigerant temperature $T_{KM}$ lies above the maximum saturation temperature $T_S$, that is to say the $CO_2$ is outside the two-phase coexistence region, then at constant temperature, the pressure falls as the level falls and, consequently, as the density D falls, as can be seen from the characteristic map of FIG. 3.

This property is used for level monitoring in this specific system state. The control unit 6 determines whether the measured $CO_2$ pressure $p_{KM}$ is less than a lower limiting value $p_u$, which corresponds to a predefined minimum density $D_{min}$ and consequently to a specific minimum level. Therefore, the determination depends on the current refrigerant temperature, as illustrated in FIG. 3 by the associated dashed characteristic curve for $p_u$ and $D_{min}$ (step 28). If the measured refrigerant pressure $p_{KM}$ falls below the predefined lower pressure limiting value $p_u$, the control unit 6 recognizes this as underfilling and generates the corresponding underfilling information (step 24).

If the measured refrigerant pressure $p_{KM}$ lies above the lower pressure limiting value $p_u(T_{KM})$ belonging to the current refrigerant temperature $T_{KM}$, the control unit 6 also determines whether it lies above a predefinable upper pressure limiting value $p_o$, which corresponds to a predefinable maximum density $D_{max}$. See the associated dashed characteristic curve in FIG. 3. Consequently, the determination is again dependent on the current refrigerant temperature $T_{KM}$ (step 29). If $p_{km} > p_o$, it is concluded that there is overfilling, that is to say too high a level, so that the control unit 6 generates corresponding overfilling information (step 30). On the other hand, if this is not so, then the refrigerant pressure $p_{KM}$ lies in the tolerable range between the lower pressure limiting value $p_u$, corresponding to a predefinable minimum density $D_{min}$ of 150 kg/m³, for example, and the upper pressure limiting value $p_o$, corresponding to a maximum density $D_{max}$ of 350 kg/m³, for example.

As becomes clear from the above description of a preferred embodiment the method according to the invention provides reliable level monitoring for a refrigerant, such as $CO_2$, circulating in a refrigerant circuit of an air-conditioning or heat-pump system (operated in the supercritical range) as a function of the operating point, both when the system is at a standstill and when the system is operating. If underfilling or overfilling is detected, appropriate warning information is generated. The latter may be used for various further actions. For example, the warning information can be displayed, for example, optically, via a control lamp. In addition, if a degree of underfilling is detected which is critical for operational safety during operation, automatic system deactivation can be carried out, for example, by switching off the compressor by disengaging an associated clutch or, in the case of a clutchless compressor, by switching to short-circuit operation.

The method according to the invention is also suitable in particular for $CO_2$ air-conditioning systems having a low-pressure collector with an "orifice tube", as it is known, and/or with high-pressure control, such as are used in motor vehicles. Depending on the application, modifications of the method variant shown are possible and are considered to fall within the scope of the invention defined by the appended claims. For example, in further method variants, only the standstill level monitoring or only the in-operation level monitoring can be implemented.

What is claimed is:

1. A method of refrigerant level monitoring in a refrigerant circuit of an air-conditioning or heat-pump system having a compressor and a refrigerant which may, depending on the operating point, be operated in the supercritical range, the method comprising:

at least in-operation level monitoring with the compressor switched on, measuring the refrigerant superheat (dTü) at the evaporator of the system, and determining whether the measured superheat (dTü) lies above a predetermined limiting value (dTü$_G$), as an indication of improper filling, wherein, the refrigerant superheat (dTü) at the evaporator is measured by using the difference between a temperature ($T_{LVA}$), measured on the evaporator outlet side, of a medium led over the evaporator for the purpose of cooling the medium, and the refrigerant temperature ($T_{KVE}$) measured on the evaporator inlet side.

2. A method as claimed in claim 1, wherein the system comprises an air-conditioning system employing $CO_2$ as refrigerant.

3. A method as claimed in claim 2, wherein the air-conditioning system comprises an automotive air-conditioning system.

4. An apparatus for refrigerant level monitoring in a refrigerant circuit of an air-conditioning or heat-pump system having a compressor and a refrigerant which may, depending on the operating point, be operated in the supercritical range, the apparatus comprising:

at least a system for in-operation level monitoring with the compressor switched on, comprising detectors for measuring the refrigerant superheat (dTü) at the evaporator of the system, and a calculation circuit for determining whether the measured superheat (dTü) lies above a predetermined limiting value (dTü$_G$), as an indication of improper filling, wherein the detectors for measuring the refrigerant superheat (dTü) at the evaporator comprise a first detector for measuring a temperature ($T_{LVA}$) on the evaporator outlet side, of a medium led over the evaporator for the purpose of cooling the medium, and a second sensor for measuring the refrigerant temperature ($T_{KVE}$) on the evaporator inlet side, and wherein the calculation circuit is programmed to determine whether the measured superheat (dTü) lies above a predetermined limiting value (dTü$_G$) based on a difference between the temperature ($T_{LVA}$) and the temperature ($T_{KVE}$).

5. An automotive vehicle, comprising:

a motor and an air-conditioner having a refrigerant circuit including a compressor and a refrigerant comprising $CO_2$ which may, depending on the operating point, be operated in the supercritical range, and a system for refrigerant level monitoring in the refrigerant circuit comprising a system for in-operation level monitoring with the compressor switched on, comprising detectors for measuring the refrigerant superheat (dTü) at the evaporator of the system, and a calculation circuit for determining whether the measured superheat (dTü) lies above a predetermined limiting value (dTü$_G$), as an indication of improper filling, wherein the detectors for measuring the refrigerant superheat (dTü) at the evaporator comprise a first detector for measuring a temperature ($T_{LVA}$) on the evaporator outlet side, of a medium led over the evaporator for the purpose of cooling the medium, and a second sensor for measuring the refrigerant temperature ($T_{KVE}$) on the evaporator inlet side, and wherein the calculation circuit is programmed to determine whether the measured superheat (dTü) lies above a predetermined limiting value (dTü$_G$) based on a difference between the temperature ($T_{LVA}$) and the temperature ($T_{KVE}$).

* * * * *